United States Patent
Yang et al.

(10) Patent No.: US 11,166,467 B2
(45) Date of Patent: Nov. 9, 2021

(54) COOKING APPLIANCE

(71) Applicant: LG ELECTRONICS INC., Seoul (KR)

(72) Inventors: Haksoon Yang, Seoul (KR); Jaekyung Yang, Seoul (KR); Yongsoo Lee, Seoul (KR); Yonghyun Lee, Seoul (KR); Yoojin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 16/354,734

(22) Filed: Mar. 15, 2019

(65) Prior Publication Data

US 2019/0327979 A1 Oct. 31, 2019

(30) Foreign Application Priority Data

Apr. 27, 2018 (KR) .................. 10-2018-0049182

(51) Int. Cl.
| | |
|---|---|
| *A21B 3/04* | (2006.01) |
| *A47J 27/04* | (2006.01) |
| *H05B 6/64* | (2006.01) |
| *A23L 5/10* | (2016.01) |
| *A47J 36/24* | (2006.01) |
| *F24C 15/32* | (2006.01) |

(52) U.S. Cl.
CPC .................. *A21B 3/04* (2013.01); *A47J 27/04* (2013.01); *H05B 6/6479* (2013.01); *A23L 5/13* (2016.08); *A23V 2002/00* (2013.01); *A47J 36/24* (2013.01); *A47J 2027/043* (2013.01); *F24C 15/32* (2013.01)

(58) Field of Classification Search
CPC ...... F24C 15/327; H05B 6/6479; A47J 27/05; A47J 2027/043; A21B 3/04
See application file for complete search history.

(56) References Cited

U.S. PATENT DOCUMENTS

| | | | | |
|---|---|---|---|---|
| 3,774,008 A | * | 11/1973 | Maniscalco | ........... F24C 15/327 |
| | | | | 219/401 |
| 2012/0272833 A1 | * | 11/2012 | Park | ........................ A21B 3/04 |
| | | | | 99/324 |
| 2012/0298656 A1 | * | 11/2012 | Han | .................. H01L 21/67115 |
| | | | | 219/756 |

FOREIGN PATENT DOCUMENTS

| | | | |
|---|---|---|---|
| EP | 2366315 | 9/2011 | |
| EP | 2366315 A1 | * 9/2011 | ............ F24C 15/327 |
| EP | 2449884 | 5/2012 | |
| JP | 2007032854 | 2/2007 | |

(Continued)

OTHER PUBLICATIONS

Translation for: KR-100662473-B1.*

(Continued)

*Primary Examiner* — Steven B McAllister
*Assistant Examiner* — Aaron H Heyamoto
(74) *Attorney, Agent, or Firm* — Fish & Richardson P.C.

(57) ABSTRACT

A cooking appliance includes a frame that defines a cooking chamber, a steam generator coupled to the frame and configured to generate steam, and a steam supply port that is connected to the steam generator, that extends through a sidewall of the frame to the cooking chamber, and that is configured to guide steam from the steam generator to the cooking chamber. The steam supply port includes a first pipe having a first diameter, a second pipe located inside of the cooking chamber, the second pipe having a second diameter that is less than the first diameter, and a connection pipe configured to connect the first pipe to the second pipe.

19 Claims, 5 Drawing Sheets

(56) References Cited

FOREIGN PATENT DOCUMENTS

| | | | |
|---|---|---|---|
| JP | 2007032854 A | * | 2/2007 |
| JP | 5525907 | | 6/2014 |
| KR | 100662473 | | 12/2006 |
| KR | 100662473 B1 | * | 12/2006 |
| KR | 10-2011-0109661 A | | 10/2011 |
| KR | 1020120122171 | | 11/2012 |

OTHER PUBLICATIONS

Translation for: JP-2007032854-A.*
Translation for: EP-2366315-A1.*
Extended European Search Report in European Application No. 18203027.0, dated Apr. 11, 2019, 8 pages.

* cited by examiner

COOKING APPLIANCE

CROSS-REFERENCE TO RELATED APPLICATION

This application is based on and claims the benefit of priority to Korean Patent Application No. 10-2018-0049182, filed on Apr. 27, 2018, in the Korean Intellectual Property Office, the disclosure of which is incorporated herein in its entirety by reference.

FIELD

The present disclosure relates to a cooking appliance.

BACKGROUND

The cooking appliance is an appliance that can cook food using heat of a heating source. The cooking appliance may include a heating source for heating food contained in a cooking chamber.

In some cases, the cooking appliance may include a plurality of heating sources. The plurality of heating sources may include an electric heater, a magnetron, a steam generator, etc.

In some cases, the cooking appliance may include a stream generator.

For example, the steam generator may include a heating space for receiving water for steam generation, a water supply port for supplying the water for steam generation to the heating space, a steam heater for heating the water for steam generation stored in the heating space to generate steam, a steam discharge port for discharging the steam heated by the steam heater, and a drain port for discharging the water for steam generation stored in the heating space to the outside of the heating space such that the water for steam generation supplied to the heating space through the water supply port is maintained at a predetermined water level.

In some cases, when the water for steam generation exceeds the predetermined water level, the water for steam generation is discharged to the outside through the drain port, thereby preventing the water for steam generation from overflowing to the inside of the cooking chamber while the water for steam generation is heated.

In some cases where a high-output heater is used and where the volume of the chamber that stores the water for steam generation is small, water may vigorously boil. In some cases when a bumping phenomenon occurs, the water for steam generation may not be discharged to the drain port and may be supplied to the cooking chamber together with steam.

In some cases when the water for steam generation is supplied to the cooking chamber, the cooking chamber may be contaminated if scales in the steam generator flow downwards along the sidewall of the cooking chamber. In some cases when a large amount of water for steam generation is supplied to the cooking chamber, an enamel vessel may be broken due to thermal shock.

SUMMARY

The present disclosure provides a cooking appliance capable of preventing water for steam generation from being discharged to the inside of a cooking chamber.

The present disclosure provides a cooking appliance capable of preventing a microwave generated in a magnetron from being leaked through a steam supply port for supplying steam.

According to one aspect of the subject matter described in this application, a cooking appliance includes a frame that defines a cooking chamber, a steam generator coupled to the frame and configured to generate steam, and a steam supply port that is connected to the steam generator, that extends through a sidewall of the frame to the cooking chamber, and that is configured to guide steam from the steam generator to the cooking chamber. The steam supply port includes a first pipe having a first diameter, a second pipe located inside of the cooking chamber, the second pipe having a second diameter that is less than the first diameter, and a connection pipe configured to connect the first pipe to the second pipe.

Implementations according to this aspect may include one or more of the following features. For example, the first pipe has a connection portion that is connected to the connection pipe and that is coaxial with the second pipe. In some examples, the second diameter is in a range of 3/10 to 1/2 of the first diameter. In some examples, the connection pipe is located inside of the cooking chamber. In some examples, a portion of the steam supply port protrudes to the cooking chamber by a length that is greater than the second diameter.

In some implementations, a length of the second pipe is less than the second diameter. In some examples, a length of the connection pipe is greater than a length of the second pipe. In some examples, a portion of the first pipe is located inside of the cooking chamber. In some examples, a length of the portion of the first pipe located inside of the cooking chamber is less than a length of the second pipe.

In some implementations, the cooking appliance further includes a magnetron configured to generate a microwave for cooking food in the cooking chamber, where the second diameter is less than 3/2 of a wavelength of the microwave. In some examples, the first pipe connects the steam generator to the connection pipe. In some examples, the first pipe, the second pipe, and the connection pipe are portions of a single pipe having different diameters, where a diameter of the connection pipe decreases from the first diameter to the second diameter.

In some implementations, the cooking appliance further includes a door configured to open and close at least a portion of the cooking chamber, where the steam supply port is located at the sidewall of the frame that faces the door. In some examples, the cooking appliance further includes a water tank located vertically higher than the steam generator and configured to supply water to the steam generator.

In some implementations, the cooking appliance further includes a water supply pipe configured to supply water from the water tank to the steam generator, a water supply pump connected to the water supply pipe and configured to cause supply of water from the water tank to the steam generator, a drain pipe connected to the water tank and configured to receive water discharged from the steam generator and to guide discharged water to the water tank, and a drainage pump connected to the drain pipe and configured to cause discharged water to return to the water tank. In some examples, the drainage pump is located vertically between the water supply pump and the steam generator.

In some implementations, the connection pipe includes an inclined surface located between the first pipe and the second pipe and configured to block flow of water from the first pipe to the second pipe. In some examples, the sidewall of the frame defines an opening configured to receive the steam supply port, where a diameter of the opening is greater than the first diameter.

In some implementations, the cooking appliance further includes a sealing member that is configured to insert to the opening and to surround an outer surface of the first pipe. In some examples, the opening is located vertically higher than the steam generator, and the first pipe is bent one or more times to guide steam from the steam generator in a horizontal direction toward the opening with respect to a bottom wall of the frame.

DETAILED DESCRIPTION

Figure 1:
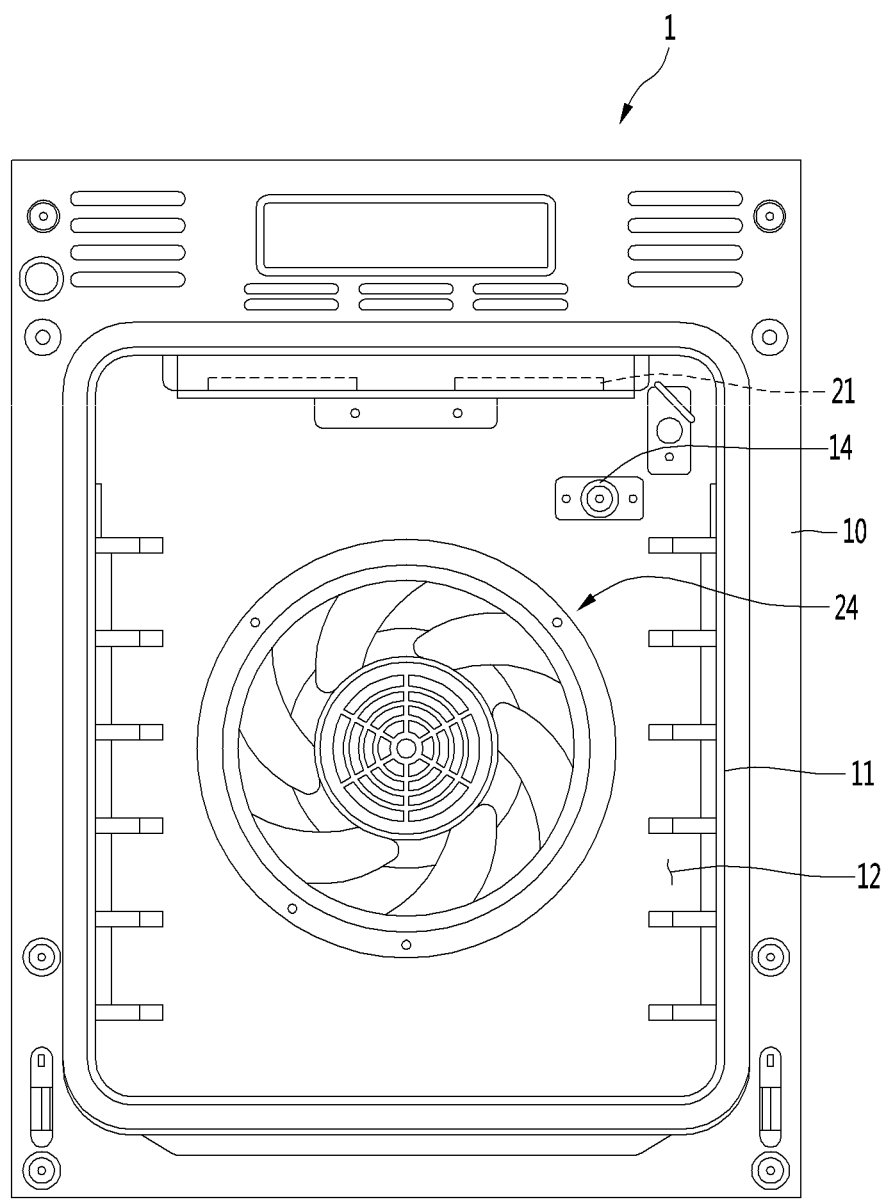
FIG. 1 is a view schematically showing an inside of an example cooking chamber of an example cooking appliance.

Hereinafter, some implementations of the present disclosure will be described in detail with reference to the accompanying drawings. It should be noted that when components in the drawings are designated by reference numerals, the same components have the same reference numerals as far as possible even though the components are illustrated in different drawings. Further, in description of implementations of the present disclosure, when it is determined that detailed descriptions of well-known configurations or functions disturb understanding of the implementations of the present disclosure, the detailed descriptions will be omitted.

Also, in the description of the implementations of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
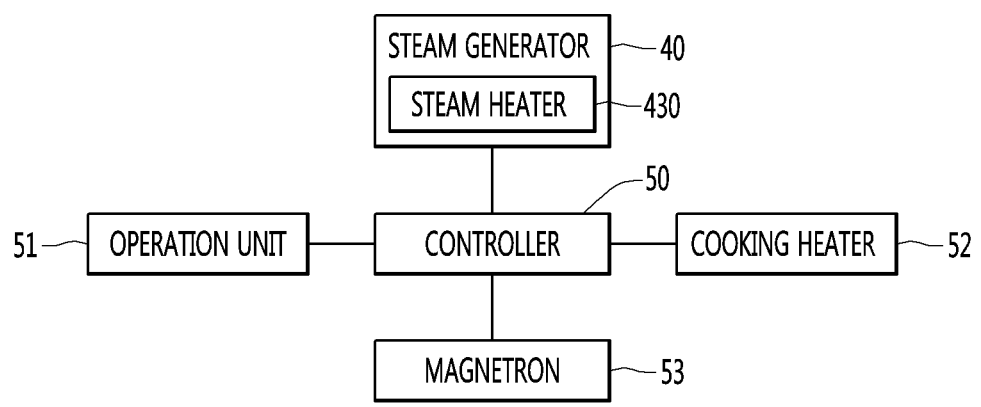
FIG. 2 is a control block diagram showing an example cooking appliance.
Figure 3:
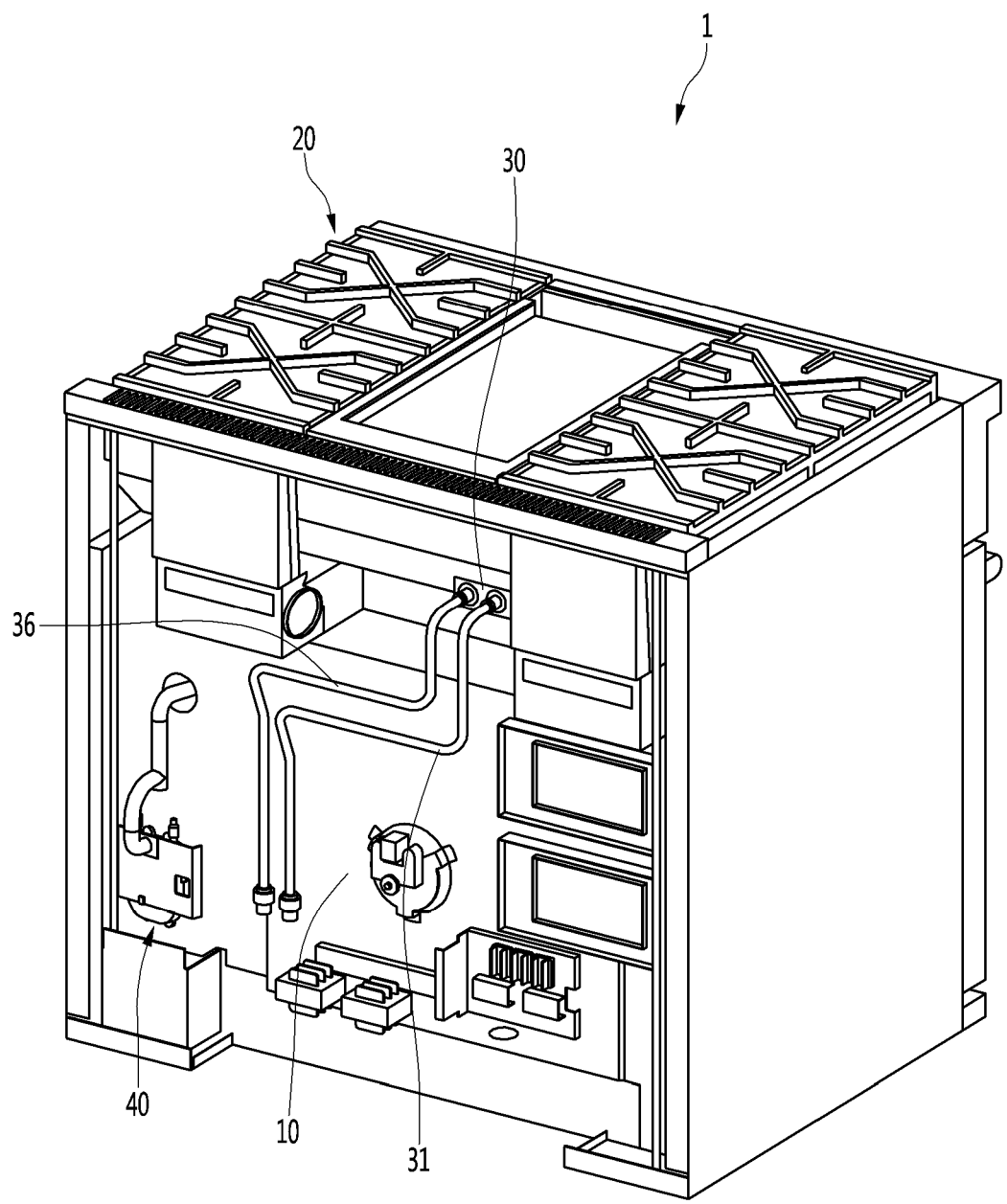
FIG. 3 is a view showing a state in which an example steam generator and an example water tank are installed in an example cooking apparatus.
Figure 4:
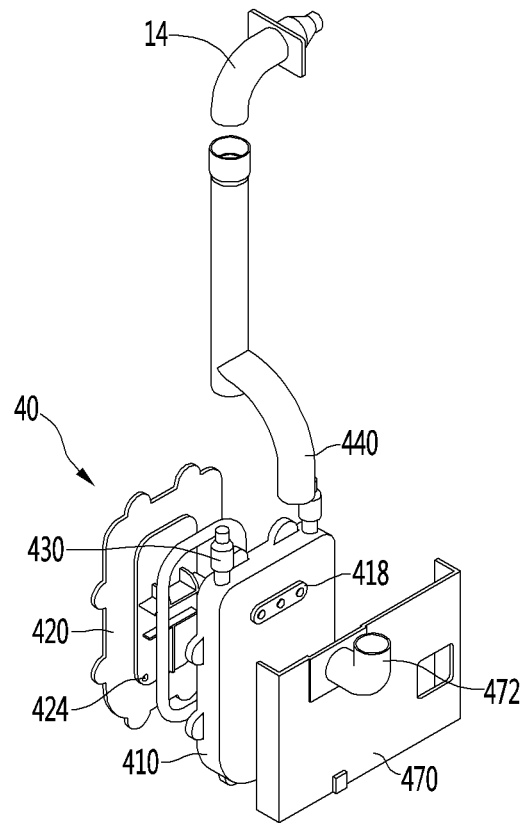
FIG. 4 is an exploded perspective view of an example steam generator.
Figure 4:
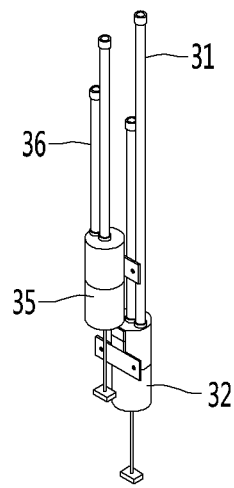

FIG. 1 is a view schematically showing an inside of an example cooking chamber of an example cooking appliance, FIG. 2 is a control block diagram showing an example cooking appliance, FIG. 3 is a view showing a state in which an example steam generator and an example water tank are installed in an example cooking apparatus, and FIG. 4 is an exploded perspective view of an example steam generator.

Referring to FIGS. 1 to 4, the cooking appliance 1 according to the present implementation may include a main body 10.

The main body 10 may include a frame 11 forming a cooking chamber 12. The cooking appliance 1 may further include a door that is connected to the main body 10 and that is configured to open and close the cooking chamber 12.

The cooking appliance 1 may further include an upper cooking part 20 for heating food independently of food contained in the cooking chamber 12 according to the type of the cooking appliance 1. Although an upper cooking part, for example, includes a burner in FIG. 2, the heating source of the upper cooking part 20 is not limited thereto.

The cooking appliance 1 may include a plurality of heating sources in order to cook the food item contained in the cooking chamber 12.

The plurality of heating sources may include different types of heating sources.

Although not limited, the plurality of heating sources may include, for example, a cooking heater 52. The cooking heater 52 may include one or more of an electric heater, a gas burner, etc.

The cooking heater 52 may include, for example, an upper heater 21 located at an upper side in the cooking chamber 12 and may supply heat to the upper side of the cooking chamber 12.

In some implementations, the upper heater 21 may be located at the upper side of the cooking chamber 12 outside the cooking chamber 12. In this case, an opening, through which heat passes, may be formed in the upper wall of the frame 11. Alternatively, when the upper heater generates radiant energy, a transmission part may be provided in the upper wall of the frame 11.

The cooking heater 52 may further include a lower heater provided at the lower side of the cooking chamber 12.

The cooking heater 52 may further include a convection heater configuring a convection device 24 according to the type of the cooking appliance. The convection device 24 may include a convection fan. By the convection fan, air in the cooking chamber 12 may flow to the convection heater, thereby being heated and then supplied to the cooking chamber 12.

The plurality of heating sources may further include a magnetron 53.

The magnetron 53 may generate a microwave for cooking food contained in the cooking chamber 12.

The plurality of heating sources may further include a steam generator 40 for heating water to generate steam.

The steam generator 40 may include a steam heater 430 for heating water.

The cooking appliance 1 may further include a water tank 30 for supplying water to the steam generator 40. Although not limited, the water tank 30 may be disposed at a position higher than the steam generator 40 at the main body 10.

For example, the water tank 30 may be located above the cooking chamber 12. The water tank 30 may be installed at the upper side of the frame 11.

When water is heated by the steam heater 430 and changed into steam, the steam may be supplied into the cooking chamber 12 through a steam supply port 14 penetrating through one sidewall of the frame 11.

The cooking appliance 1 may further include a water supply pipe 31 for supplying water of the water tank 30 to the steam generator 40, a water supply pump 32 connected to the water supply pipe 31, a drain pipe 36 for discharging water of the steam generator 40, and a drainage pump 35 connected to the drain pipe 36.

Although not limited, the drain pipe 36 may be connected to the water tank 30. Accordingly, the water of the water tank 30 may be supplied to the steam generator 40, and the water of the steam generator 40 may be drained and returned to the water tank 30.

The cooking appliance 1 may further include an operation unit 51 for selecting a cooking mode or a type of each of the plurality of heating sources and a controller 50 for controlling the plurality of heating sources by a command received from the operation unit 51.

As described above, since different types of heating source are provided, the cooking appliance 1 may cook various types of food using various cooking modes.

In the present implementation, the cooking mode may include a first cooking mode for cooking food using at least steam and a second cooking mode for cooking food using the magnetron 53.

In some implementations, the steam generator 40 may include a first body 410 and a second body 420 coupled to the first body 410.

In a state in which the first body 410 and the second body 420 are coupled, the first body 410 and the second body 420 may define a heating chamber.

A steam heater 430 may be embedded in any one of the first body 410 or the second body 420.

In FIG. 4, for example, the steam heater 430 is installed in the first body 410.

Water supplied from the water tank 30 may be heated by heat generated by the steam heater 430 in the heating chamber.

A water supply part for supplying water to the heating chamber may be provided in any one of the first body 410 or the second body 420. The water supply part may communicate with the water supply pipe 31.

In the present implementation, the water supply part may be provided in the first body 410, for example.

A steam discharge part 418 for discharging steam generated by the heating chamber may be provided in any one of the first body 410 or the second body 420.

In FIG. 4, the steam discharge part 418 is provided on the first body 410, for example.

A drain part 424 for discharging water of the heating chamber may be provided in any one of the first body 410 or the second body 420.

In FIG. 4, for example, the drain part 424 is provided in the second body 420.

The water supply part may be located at a position higher than the drain part 424 and located at a position lower than the steam discharge part 418.

For example, the water supply part may be located at the center of the heating chamber, the steam discharge part 418 may be located at the upper side of the heating chamber, and the drain part 424 may be located at the lower side of the heating chamber.

The steam generator 40 may further include a mounting bracket 470 for mounting the steam generator 40 in the frame 11. The mounting bracket 470 may be, for example, coupled to the first body 410.

The mounting bracket 470 may include a steam guide pipe 472 for guiding the steam discharged from the steam discharge part 418.

The cooking appliance 1 may further include a steam supply pipe 440 connected to the steam guide pipe 472 to supply the steam generated by the steam generator 40 to the cooking chamber 12.

The steam supply pipe 440 may be connected to a steam supply port 14. The steam supply port 14 is, for example, coupled to the frame 11 to finally supply steam to the cooking chamber 12.

Accordingly, at least a portion of the steam supply port 14 may be exposed to the cooking chamber 12.

As another example, the steam supply pipe 440 may be directly connected to the frame 11 and the end of the steam supply pipe 440 may include the steam supply port 14.

The steam supply pipe 440 is bent once or more to guide the stream discharged from the steam discharge part 418 upward and to supply the steam to the cooking chamber 12.

Hereinafter, the structure of the steam supply port will be described in detail.

Figure 5:
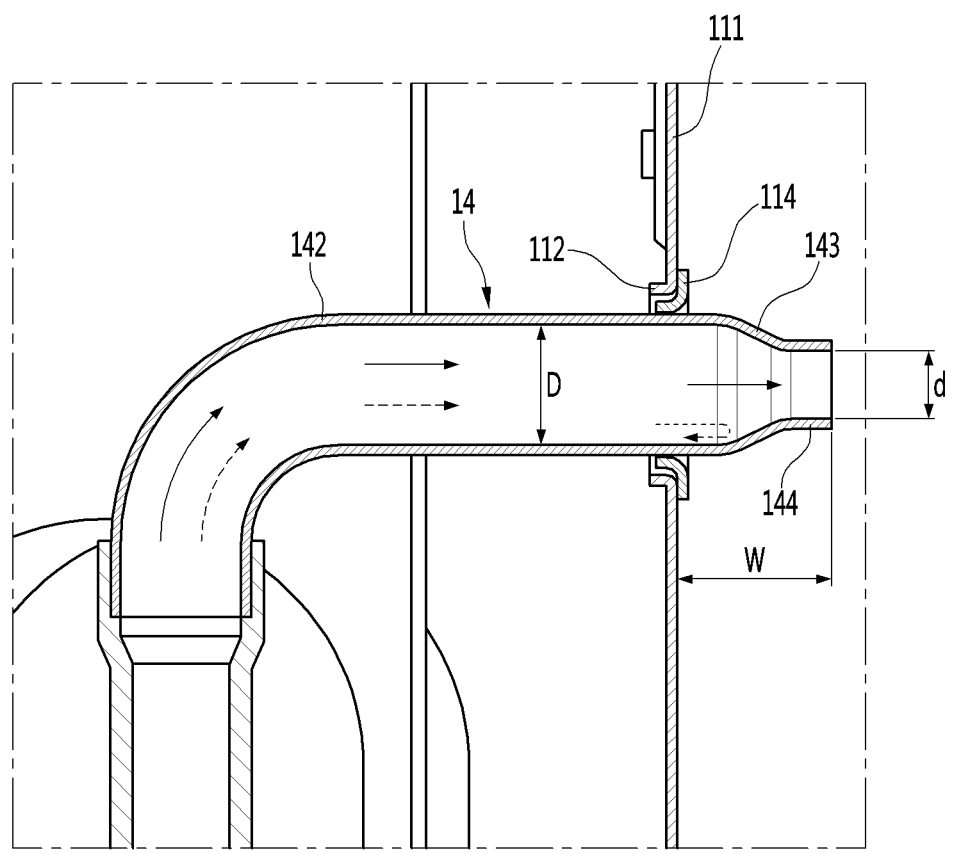
FIG. 5 is a cross-sectional view showing an example steam supply port that is guided to an example cooking chamber through an example frame.

FIG. 5 is a cross-sectional view showing an example steam supply port that is guided to an example cooking chamber through an example frame.

Referring to FIGS. 1, 4, and 5, the steam supply port 14 may be formed in the form of a pipe having a predetermined length.

The steam supply port 14 is connected to the steam supply pipe 440 outside the cooking chamber 12, and a portion thereof penetrates through one sidewall 111 of the frame 11 to be located in the cooking chamber 12.

An opening 112, through which the steam supply port 14 penetrates, is defined in one sidewall 111 of the frame 11.

In addition, a sealing member 114 is coupled to surround the circumference of the steam supply port 14 such that the steam supplied into the cooking chamber 12 is prevented from being leaked through the opening 112. In addition, the sealing member 114 is located in the opening 112 to cover the opening 112.

The steam supply port 14 may include a first pipe 142 having a first diameter D (inner diameter), a second pipe 144 having a second diameter d (inner diameter) less than that of the first pipe 142, and a connection pipe 143 for connecting the first pipe 142 and the second pipe 144.

If the second diameter d of the second pipe 144 is less than the first diameter D of the first pipe 142, steam is rapidly supplied to the cooking chamber 12 to be smoothly spread in the cooking chamber 12.

For example, the second diameter d may be in a range of 3/10 to 1/2 of the first diameter D.

The center of a portion, which is connected to the connection pipe 143, of the first pipe 142 may match the center of the second pipe 144, such that the water for steam generation is prevented from being discharged to the cooking chamber 12.

Accordingly, the connection pipe 143 includes an inclined surface in order to connect the two pipes 142 and 144 having different diameters.

Even when water for steam generation (see dotted lines) flows in the first pipe 142 together with steam (see slid lines), the water for steam generation of the first pipe 142 is struck against the connection pipe 143 before being moved from the first pipe 142 to the second pipe 144, and is moved from the connection pipe 143 back to the first pipe 142.

That is, the connection pipe 143 serves as a resistance wall for preventing water for steam generation from being moved from the first pipe 142 to the second pipe 144.

The water for steam generation, which is struck against the connection pipe 143, may be returned from the first pipe 142 toward the steam generator 40.

The length W of a portion protruding from the steam supply port 14 to the inside of the cooking chamber 12 is greater than the second diameter d of the second pipe 144, such that the water for steam generation is efficiently prevented from flowing into the cooking chamber 12.

The portion protruding from the steam supply port 14 to the inside of the cooking chamber 12 may include at least the connection pipe 143 and the second pipe 144.

That is, the connection pipe 143 and the second pipe 144 of the steam supply port 14 may be located in the cooking chamber 12.

In some implementations, the portion protruding from the steam supply port 14 to the inside of the cooking chamber 12 may include a portion of the first pipe 142. That is, the portion of the first pipe 142 may be located in the cooking chamber 12.

The length of the portion of the first pipe 142, which is located inside the cooking chamber 12, may be less than the length of the second pipe 144.

In some examples, the length of the connection pipe 143 may be greater than the length of the second pipe 144, in order to prevent the water for steam generation from flowing into the second pipe 144 by the connection pipe 143 and to prevent a phenomenon that the connection pipe 143 restricts flow of the steam.

In addition, the length of the second pipe 144 may be less than the second diameter d of the second pipe 144, in order to reduce channel resistance by the second pipe 144.

In some implementations, when the magnetron 53 operates, a microwave generated in the magnetron 53 should not be leaked through the steam supply port 14.

In some implementations, the second diameter d of the second pipe 144 may be less than 3/2 of the wavelength λ of the microwave.

According to the structure of the steam supply port of the present disclosure, even when water for steam generation is discharged through the steam discharging port together with steam while the steam generator generates steams, it is possible to prevent the water for steam generation from being discharged from the steam discharging port to the cooking chamber.

Accordingly, it may be possible to prevent the water for steam generation from flowing downward along one sidewall of the cooking chamber, which may contaminate the cooking chamber 12.

In some examples where the cooking appliance includes the magnetron, it may be possible to prevent the microwave generated in the magnetron 53 from being leaked through the steam supply port.

What is claimed is:

1. A cooking appliance comprising:
    a frame that defines a cooking chamber;
    a magnetron configured to generate a microwave for cooking food in the cooking chamber;
    a steam generator coupled to the frame and configured to generate steam; and
    a steam supply port that is connected to the steam generator, that extends through a sidewall of the frame to the cooking chamber in a horizontal direction, and that is configured to guide steam from the steam generator to the cooking chamber,
    wherein the steam supply port comprises:
        a first pipe having a first diameter,
        a second pipe located inside of the cooking chamber, the second pipe having a second diameter that is less than the first diameter, and
        a connection pipe that connects the first pipe to the second pipe portion,
    wherein the first pipe, the second pipe, and the connection pipe are portions of a single pipe having different diameters, and a diameter of the connection pipe decreases from the first diameter to the second diameter, and
    wherein the second diameter is less than 3/2 of a wavelength of the microwave.

2. The cooking appliance of claim 1, wherein the first pipe comprises a connection portion that is connected to the connection pipe and that is coaxial with the second pipe.

3. The cooking appliance of claim 2, wherein the second diameter is in a range of 3/10 to 1/2 of the first diameter.

4. The cooking appliance of claim 1, wherein the connection pipe is located inside of the cooking chamber.

5. The cooking appliance of claim 4, wherein a portion of the steam supply port protrudes to the cooking chamber by a length that is greater than the second diameter.

6. The cooking appliance of claim 1, wherein a length of the second pipe is less than the second diameter.

7. The cooking appliance of claim 1, wherein a length of the connection pipe is greater than a length of the second pipe.

8. The cooking appliance of claim 1, wherein a portion of the first pipe is located inside of the cooking chamber.

9. The cooking appliance of claim 8, wherein a length of the portion of the first pipe located inside of the cooking chamber is less than a length of the second pipe.

10. The cooking appliance of claim 1, wherein the first pipe connects the steam generator to the connection pipe.

11. The cooking appliance of claim 1, further comprising a door configured to open and close at least a portion of the cooking chamber,
    wherein the steam supply port is located at the sidewall of the frame that faces the door.

12. The cooking appliance of claim 1, further comprising a water tank located vertically higher than the steam generator and configured to supply water to the steam generator.

13. The cooking appliance of claim 12, further comprising:
    a water supply pipe configured to supply water from the water tank to the steam generator;
    a water supply pump connected to the water supply pipe and configured to cause supply of water from the water tank to the steam generator;
    a drain pipe connected to the water tank and configured to receive water discharged from the steam generator and to guide discharged water to the water tank; and
    a drainage pump connected to the drain pipe and configured to cause discharged water to return to the water tank.

14. The cooking appliance of claim 13, wherein the drainage pump is located vertically between the water supply pump and the steam generator.

15. The cooking appliance of claim 1, wherein the connection pipe includes an inclined surface located between the first pipe and the second pipe and configured to block flow of water from the first pipe to the second pipe.

16. The cooking appliance of claim 1, wherein the sidewall of the frame defines an opening configured to receive the steam supply port, and
    wherein a diameter of the opening is greater than the first diameter.

17. The cooking appliance of claim 16, further comprising a sealing member that is configured to insert to the opening and to surround an outer surface of the first pipe.

18. The cooking appliance of claim 16, wherein the opening is located vertically higher than the steam generator, and
    wherein the first pipe is bent one or more times to guide steam from the steam generator in the horizontal direction toward the opening with respect to a bottom wall of the frame.

19. The cooking appliance of claim 1, further comprising a steam supply pipe that is connected to the steam generator and that extends upward in a vertical direction,
    wherein the first pipe has a curved shape including a first end that is connected to the steam supply pipe and that extends upward in the vertical direction, and a second end that faces the connection pipe and that extends in the horizontal direction.

* * * * *